US009951279B2

(12) United States Patent
Mason

(10) Patent No.: US 9,951,279 B2
(45) Date of Patent: Apr. 24, 2018

(54) GASIFIER WITH CONTROLLED BIOCHAR REMOVAL MECHANISM

(71) Applicant: All Power Labs, Berkeley, CA (US)

(72) Inventor: James Mason, Berkeley, CA (US)

(73) Assignee: All Power Labs, Inc., Berkeley, CA (US)

( * ) Notice: Subject to any disclaimer, the term of this patent is extended or adjusted under 35 U.S.C. 154(b) by 713 days.

(21) Appl. No.: 13/834,073

(22) Filed: Mar. 15, 2013

(65) Prior Publication Data

US 2013/0264831 A1   Oct. 10, 2013
US 2017/0130131 A9   May 11, 2017

Related U.S. Application Data

(63) Continuation-in-part of application No. 12/846,807, filed on Jul. 29, 2010, now Pat. No. 8,764,857.

(60) Provisional application No. 61/620,567, filed on Apr. 5, 2012.

(51) Int. Cl.
 *C10J 3/48* (2006.01)
 *C10B 47/00* (2006.01)
 *F02B 63/04* (2006.01)

(52) U.S. Cl.
 CPC .............. *C10B 47/00* (2013.01); *F02B 63/04* (2013.01)

(58) Field of Classification Search
 CPC ...... C10B 47/00; F02B 43/08; C10J 2200/31; C10J 2300/0916; C10J 2300/1253; C10J 2300/165; C10J 3/26; C10J 3/62; C10K 3/003; Y02E 50/14; Y02T 10/32; Y02T 10/34; Y02T 10/36

USPC .......................................................... 202/105
See application file for complete search history.

(56) References Cited

U.S. PATENT DOCUMENTS

| 4,278,064 A | 7/1981 | Regueiro |
| 4,488,364 A | 12/1984 | Herschel |
| 5,393,315 A | 2/1995 | Alliston et al. |
| 6,039,774 A | 3/2000 | Mcmullen et al. |
| 6,112,677 A | 9/2000 | Kuntschar et al. |
| 6,398,921 B1 | 6/2002 | Moraski |
| 8,344,528 B2 | 1/2013 | Bassett |
| 8,764,857 B2 | 7/2014 | Mason |
| 8,829,695 B2 | 9/2014 | Mason et al. |
| 2004/0111968 A1 | 6/2004 | Day et al. |
| 2005/0109603 A1 | 5/2005 | Graham |
| 2005/0247553 A1 | 11/2005 | Ichikawa et al. |
| 2006/0265954 A1 | 11/2006 | Dogru et al. |
| 2007/0006528 A1 | 1/2007 | Diebold et al. |

(Continued)

FOREIGN PATENT DOCUMENTS

| CN | 1277339 A | 12/2000 |
| EP | 0091991 A | 10/1983 |

(Continued)

*Primary Examiner* — Mark Laurenzi
*Assistant Examiner* — Anthony Ayala Delgado
(74) *Attorney, Agent, or Firm* — Jeffrey Schox; Diana Lin

(57) ABSTRACT

A biochar and electric power generator that receives carbonaceous material and outputs variable amounts of electrical energy and char, including a pyrolysis module, a reaction module, and a char removal mechanism arranged between the pyrolysis module and the reaction module, an engine module including an engine and an alternator, configured to convert gaseous fuel produced by the reaction module into electric power and to provide waste heat to the pyrolysis module, and a flare configured to burn tar gas and to provide waste heat to the pyrolysis module.

17 Claims, 5 Drawing Sheets

(56) References Cited

U.S. PATENT DOCUMENTS

| | | |
|---|---|---|
| 2007/0089367 A1 | 4/2007 | Goddard |
| 2007/0111051 A1 | 5/2007 | Muradov |
| 2007/0220805 A1 | 9/2007 | Leveson et al. |
| 2007/0220810 A1 | 9/2007 | Leveson et al. |
| 2007/0245934 A1 | 10/2007 | Carman |
| 2009/0239279 A1 | 9/2009 | Hall et al. |
| 2010/0043291 A1 | 2/2010 | Ljunggren |
| 2011/0023363 A1 | 2/2011 | Mason |
| 2013/0264831 A1 | 10/2013 | Mason |
| 2014/0250784 A1 | 9/2014 | Mason |

FOREIGN PATENT DOCUMENTS

| | | |
|---|---|---|
| EP | 2145939 A | 1/2010 |
| EP | 2374863 A | 10/2011 |
| EP | 2459686 A1 | 6/2012 |
| WO | 2008073021 A | 6/2008 |

GASIFIER WITH CONTROLLED BIOCHAR REMOVAL MECHANISM

CROSS-REFERENCE TO RELATED APPLICATIONS

This application is a continuation-in-part of U.S. patent application Ser. No. 12/846,807, filed 29 Jul. 2010, now issued as U.S. Pat. No. 8,764,857. This application also claims the benefit of U.S. Provisional Application No. 61/620,567 filed 5 Apr. 2012, which is incorporated in its entirety by this reference.

This application is related to U.S. Nonprovisional application Ser. No. 12/846,807 filed 29 Jul. 2010, which is incorporated in its entirety by this reference.

TECHNICAL FIELD

This invention relates to the field of gasification and pyrolysis, and more specifically, to a new and useful gasifier from which charcoal can be removed simultaneously while producing gas for power generation from biomass.

BACKGROUND

Biochar (terra preta) is a charcoal created from biomass under controlled conditions to optimize its performance as a soil amendment. Char is widely believed to improve plant growth and general soil health via increases in soil microbial activity, increased water and mineral retention, increased soil organic matter, reduced need for fossil fertilizers, increased resistance to disease, and other potential mechanisms. Furthermore, the introduction of charcoal to soils is believed to reduce atmospheric green house gases by preventing CH4 and N2O release from decaying biomass, as well as through long-term removal of carbon from the carbon cycle via underground sequestration as stable charcoal. When charcoal production is combined with energy generation (e.g., through biomass gasification), the total energy and soil cycle is carbon negative. Power is generated and soils are improved, while simultaneously drawing down atmospheric GHG levels.

Pyrolysis, the method used to create charcoal, is currently heavily used in industrial plants to produce a variety of products. However, consumers, particularly those consumers who can both produce biomass and utilize char, rarely utilize these industrial plants to convert their biomass to char. This is due to access, transportation, and convenience issues. Furthermore, the large size and expense of running a pyrolysis plant generally prevents consumers from building or purchasing one of their own. Instead, the consumers dispose of the biomass in other ways, such as burning, that do not reclaim the energy stored within the biomass, nor the minerals or carbonaceous matter that would otherwise be of benefit to soils.

Gasifiers present an appealing solution to this issue, as gasifiers utilize pyrolization in the production of syngas, and produce charcoal as an intermediary to syngas. Furthermore, gasifiers (such as that described in U.S. application Ser. No. 12/846,807, incorporated herein in its entirety) can be scaled down for consumer use. However, consumer gasifiers currently do not have an effective means of interrupting the gasification process to remove charcoal with characteristics appropriate for use as biochar. While typical downdraft gasifiers do have a charcoal and ash byproduct that remains after combustion and reduction, this charcoal is not ideal for use as biochar. More specifically charcoal collected post downdraft gasification has passed through the high temperatures of combustion and reduction in the hearth, which completely devolatilizes the charcoal. Biochar is typically believed to benefit from a lower temperature pyrolysis, so as to leave a portion of the volatiles in the char, which is useful nutrition for soil microbes. Furthermore, very little charcoal is typically left post hearth, as most has usually been consumed during reduction to produce gas, so post hearth collection does not produce the high volumes of charcoal usually desired.

Thus, there is a need in the biochar field to create a new and useful gasifier from which biochar can be removed. Moreover, there is a need in the biomass generator field to create a new and useful generator from which electrical power and biochar can be extracted simultaneously, and in variable ratios.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
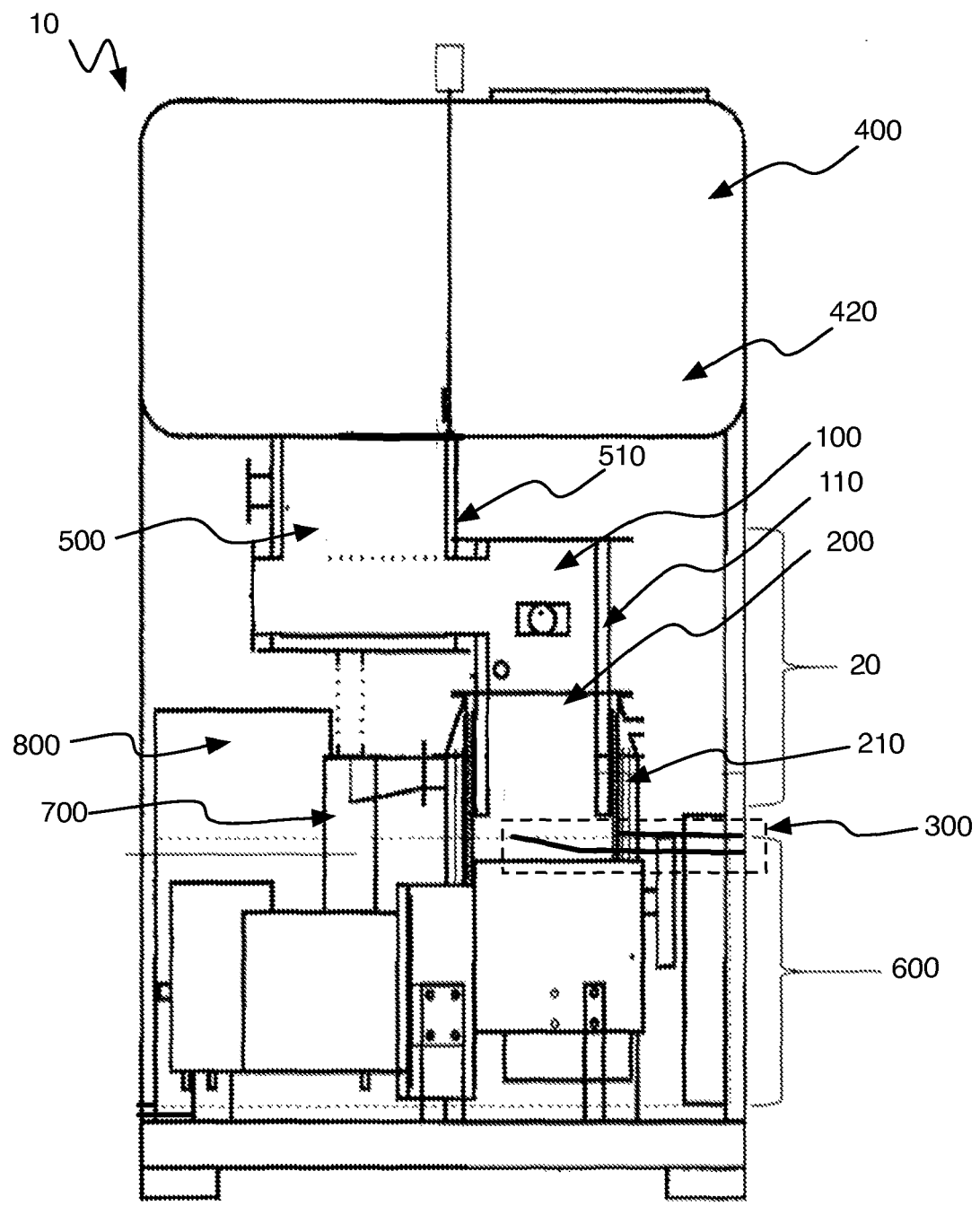
FIG. 1 is a schematic representation of a generator including the gasifier.

As shown in FIG. 1, the gasifier 20 includes a pyrolysis module 100, a reaction module 200, and a char removal mechanism 300 that cooperate to produce the gaseous fuel from carbonaceous material and to facilitate char removal from the system. The gasifier 20 preferably dries the carbonaceous material, pyrolyses the carbonaceous material into tar gas and char (biochar), combusts the volatile tar gas, and reduces the combusted tar gas with the char to produce syngas. This gasifier 20 enables biochar removal by utilizing a dedicated pyrolysis module 100 that is substantially separate from a dedicated reaction module 200, such that pyrolysis on the carbonaceous material is substantially completed prior to introduction into the reaction module 200. This gasifier 20 enables separation of the pyrolysis module 100 from the reaction module 200 by utilizing a heat source external from the gasifier 20 to heat the pyrolysis module 100, such that pyrolysis module heating is substantially separate from reaction module heating. To obtain biochar, the gasifier 20 facilitates charcoal removal after pyrolysis from the pyrolysis module 100. The gasifier 20 is preferably a downdraft gasifier, wherein gaseous fuel flows in the same direction (e.g., downwards) as the carbonaceous material.

However, the gasifier 20 can alternatively be a fluidized bed, crossdraft gasifier, updraft gasifier, or any other suitable gasifier.

The carbonaceous material accepted by the gasifier 20 can be any suitable type of material that includes carbon, hydrogen, and oxygen. The gasifier 20 preferably accepts biomass (such as wood, plants, or algae) but can accept biodegradable waste (such as any waste generated by a plant or animal), coal, or any other suitable carbonaceous material.

Figure 2:
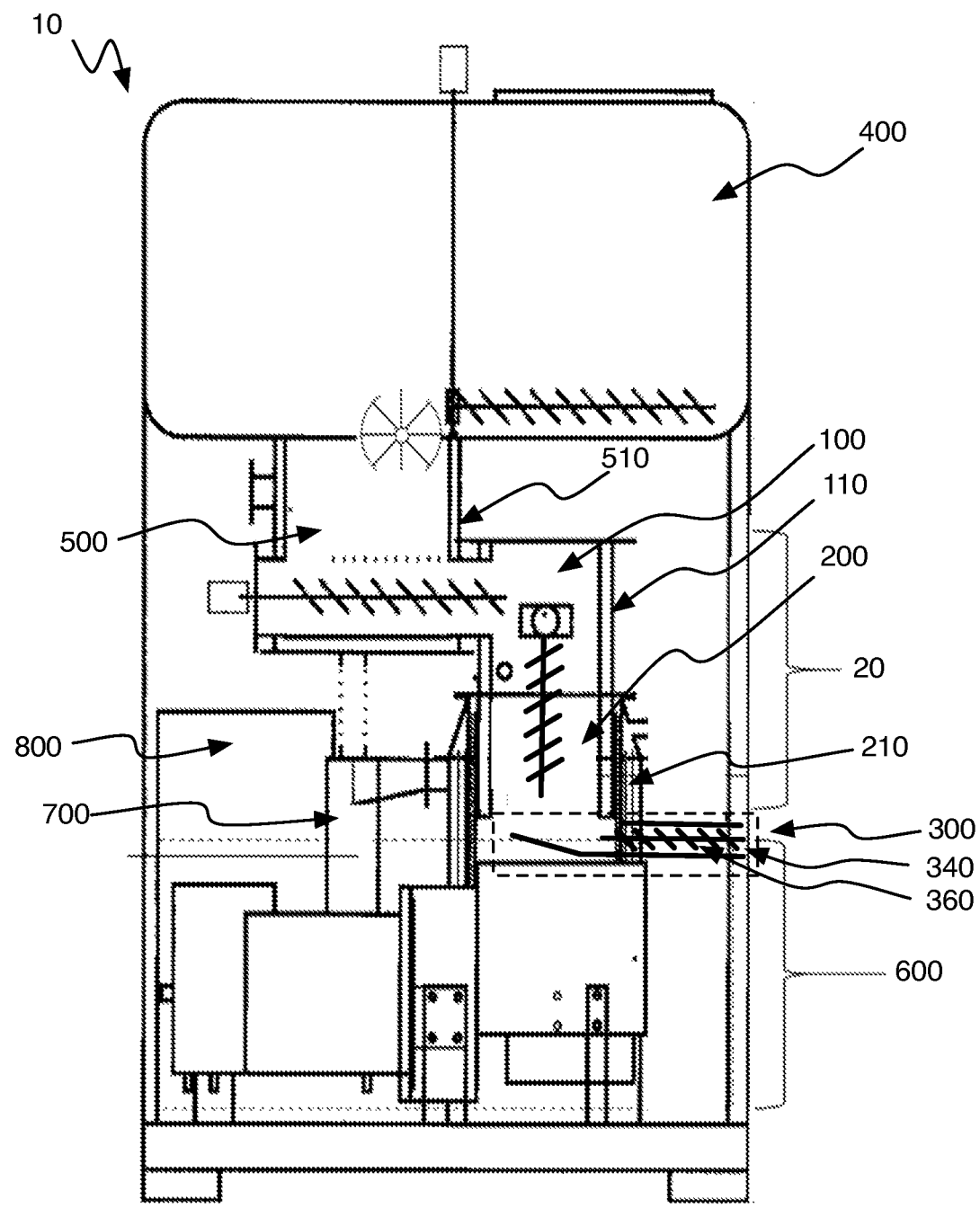
FIG. 2 is a schematic representation of a generator including the hopper, dryer, pyrolysis, and char transporters.

As shown in FIG. 1, the pyrolysis module 100 of the gasifier 20 functions to pyrolyze carbonaceous material into tar gas and char. More specifically, the carbonaceous material is heated at a substantially high temperature (typically above 220° C.), in the substantial absence of oxygen (anhydrous pyrolysis), thermolysing the carbonaceous material into volatile tar gas and char. The tar gas and char contribute substantially to later processes in gasification. The pyrolysis module 100 is preferably located below the drying module 500, such that gravity assists in passing dried carbonaceous material through the pyrolysis module 100. However, the pyrolysis module 100 is preferably offset from the dryer such that carbonaceous material flow rates between the dryer and the pyrolysis module 100 can be controlled. Alternatively, the drying module 500 and pyrolysis module 100 can have any other suitable configuration. Dried carbonaceous material is preferably moved from the dryer to the pyrolysis module 100 by way of a dryer transporter, but can alternatively be moved by gravity (e.g., the carbonaceous material drops into the pyrolysis module 100), or be moved in any other suitable manner. As shown in FIG. 2, the pyrolysis module 100 is preferably aligned above the reaction module 200, wherein gravity preferably moves material through the pyrolysis module. The rate of char transport through the pyrolysis module is preferably determined by the rate at which char is removed by the char removal mechanism 300, or by the rate at which char is consumed (e.g., reduced) to produce gas for power generation. The pyrolysis module 100 preferably pyrolyzes the carbonaceous material at 400-500° C., but can pyrolyze the material at higher or lower temperatures.

Figure 3:
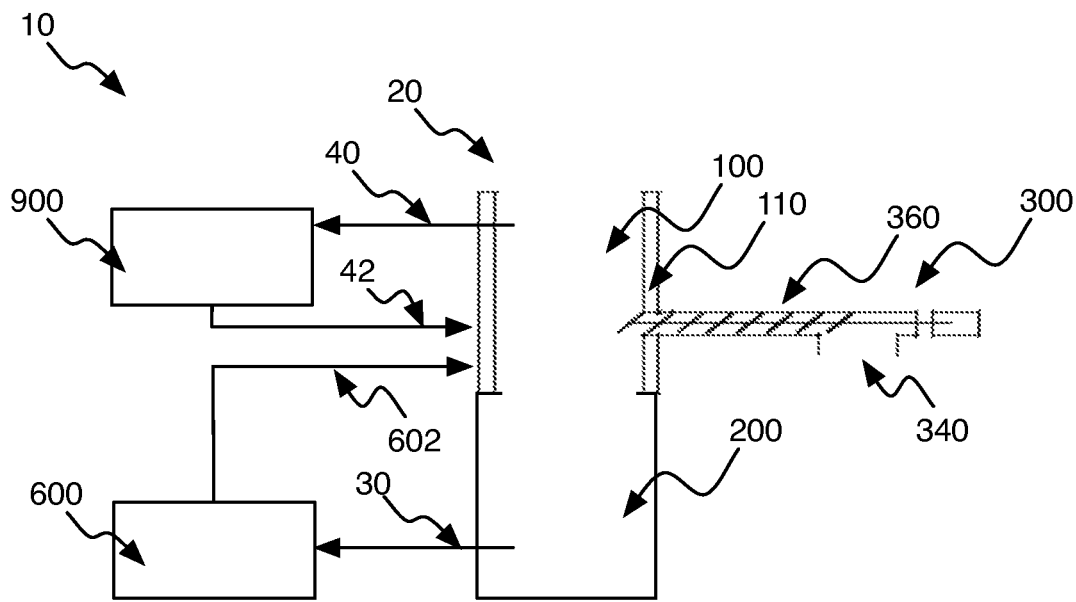
FIG. 3 is a schematic representation of a variation of the power generation system operable between a full char extraction mode and a full power generation mode.

The pyrolysis module 100 is preferably heated by a heat source that is external from the gasifier (external heat source) and/or separate from the heat source for the reaction module 200. The external heat source can be the engine exhaust gas 602, combusted tar gas, or gaseous fuel. As shown in FIG. 3, the engine exhaust gas 602 is preferably produced from an engine that burns the gaseous fuel produced from the reaction module 200. The combusted tar gas is preferably produced from tar gas that is drawn from the pyrolysis module 100, more preferably the top of the pyrolysis module 100, and combusted with a flare (e.g., burner that combusts air and tar gas within a fluid manifold). The gaseous fuel is preferably the fuel produced by the reaction module 200. However, the external heat source can be a dedicated heater or any other suitable heat source. The pyrolysis module 100 is preferably heated through a heat exchanger (first heat exchanger 110) that receives hot gas, wherein the first heat exchanger is preferably thermally connected to the walls of the pyrolysis module. The first heat exchanger can be an annular heat exchanger surrounding the pyrolysis module, but can alternatively be a thermally conductive tube wrapped about the pyrolysis module or any other suitable heat exchanger. The inlet of the first heat exchanger is preferably fluidly connected to the gas source (e.g., engine exhaust, combusted tar gas, or gaseous fuel), and the outlet of the first heat exchanger is preferably fluidly connected to ambient and/or another component of a power generation system of which the gasifier 20 is a component (e.g., particularly when the heat source is gaseous fuel). The pyrolysis module 100 can be heated from one or more of the aforementioned sources. When multiple gaseous heat sources are used, the first heat exchanger inlet is preferably fluidly connected to a multi-way valve that selectively connects the first heat exchanger to a different gas stream. Alternatively, the first heat exchanger inlet can be fluidly connected to the multiple gaseous sources by a substantially open connection. In one variation of the gasifier 20, the first heat exchanger inlet is fluidly connected to both the engine exhaust and the gaseous output of a flare by a substantially unobstructed connection. In another variation of the gasifier 20, the first heat exchanger inlet is connected to the fuel output of the reactor module 200 and to the engine exhaust and/or flare output by a multi-way valve (e.g., a two-way valve) that selectively connects the first heat exchanger to the reactor module outlet or the engine exhaust/flare output based on the amount of char being removed from the system, in comparison to the gas drawn by the engine. (e.g., percentage or mass rate threshold) extracted from the system. For example, the valve can fluidly connect the first heat exchanger to the flare output when the amount of extracted char is high and the engine gas draw is low (e.g., when minimal heat is available from the engine exhaust). Alternatively, the valve can fluidly connect the first heat exchanger to the engine exhaust when char removal is low in relation to the engine draw, or connect both the flare and engine exhaust to the first heat exchanger when high amounts of char and moderate amount of power are desired simultaneously.

As shown in FIG. 1, the reaction module 200 of the gasifier 20 functions to combust the volatile tar gasses in the presence of oxygen and to reduce the combusted tar gas with the hot char. The reaction module 200 preferably includes an air inlet coupled to a reaction zone. The air inlet functions to provide oxygen to the reaction module 200, preferably from the ambient environment but alternatively from any other source. The reaction zone functions to combust the volatile tar gas with the oxygen, and to reduce the combusted tar gas with the char. The air inlet is preferably coupled to the top of the reaction module 200 (e.g., proximal the pyrolysis module 100) or near the outlet of the pyrolysis module 100, such that tar gas is combusted as it exits the pyrolysis module 100 within the combustion zone. The combusted tar gas preferably drops down into the reduction zone (e.g., the lower portion of the reaction module 200) after combustion. The reaction module 200 is preferably aligned below the pyrolysis module 100 (e.g., along a gravity vector), more preferably coaxially aligned below the pyrolysis module 100, such that char and tar gasses drop into the pyrolysis module 100 along a gravity vector. However, the pyrolysis module 100 can be arranged in any suitable orientation relative to the reaction module 200. The gaseous fuel is preferably vented out from the reaction module 200 after reduction, preferably from the lower portion of the reaction module 200, but alternatively from any suitable portion of the reaction module 200.

The char removal mechanism 300 functions to allow outside access to the char, preferably before the char is oxidized by the combusted tar gasses and/or before the char reduces the tar gasses, but can alternatively be removed after. The char removal mechanism 300 is preferably arranged in the material path between the pyrolysis module 100 and the reaction module 200. The char removal mechanism 300 can be operable between a standby mode, wherein the char removal mechanism 300 allows access to little or no char and allows a substantial portion of the generated char to pass through to the reaction module 200; and a collection mode, wherein the char removal mechanism 300 allows access to a substantial portion of the generated char. The char removal mechanism mode is preferably controlled by a drive mechanism, such as a motor, but can alternatively be manually or otherwise controlled. The char removal mechanism mode can be determined by a control system that controls the gasifier 20, but can alternatively be controlled by a user. The char removal mechanism mode is preferably selected based on the gasifier product demand (e.g., syngas demand, char demand, etc.) but can alternatively be selected based on the temperature of the reaction module 200, the temperature of the pyrolysis module, the temperature of the char exiting the pyrolysis module, or on any other suitable parameter. Alternatively, the char removal mechanism 300 can only be operable in one mode (e.g., always collecting a predetermined portion of the generated char).

The access port 340 of the char removal mechanism 300 functions to permit outside access to the char within the gasifier 20, and can additionally function to maintain the air seal within the gasifier system, but can alternatively be any suitable access port 340 that maintains the internal air pressure, minimizes the amount of oxygen released into the system, and allows/facilitates material transport from within the gasifier 20 to the outside. The access port 340 is preferably a controlled material transfer point that substantially maintains the air seal. The access port 340 can include a one-way valve or an airlock, wherein the airlock is preferably a rotary airlock (e.g., oriented with the rotational axis perpendicular a gravity vector but alternatively oriented in any suitable location), or any other suitable airlock. Alternatively, the access port 340 can be substantially open to the environment. The access port 340 is preferably arranged exterior the gasifier 20, and can be located on the gasifier exterior, on the exterior of a casing encasing the gasifier 20, or at any other suitable location. The access port 340 is preferably a sample port (e.g., one through which a user can insert a scoop or shovel to extract char, one that maintains an air seal with a valve, etc.) but can alternatively be the air inlet of the reaction module, an end of a chute, an end of a tube that wraps around the bottom of the reaction module 200, an end of a tube that wraps around the drying module 500 (e.g., to dry the carbonaceous fuel), or any other suitable access port 340.

Figure 4:
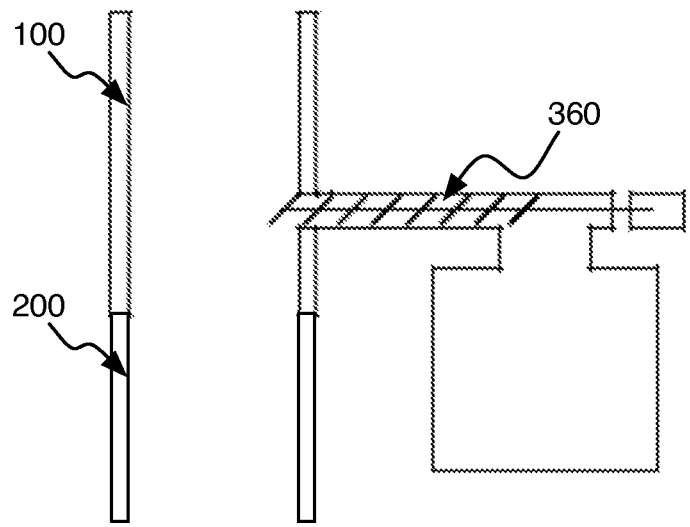
FIG. 4 is a schematic representation of a variation of the char removal mechanism.
Figure 5:
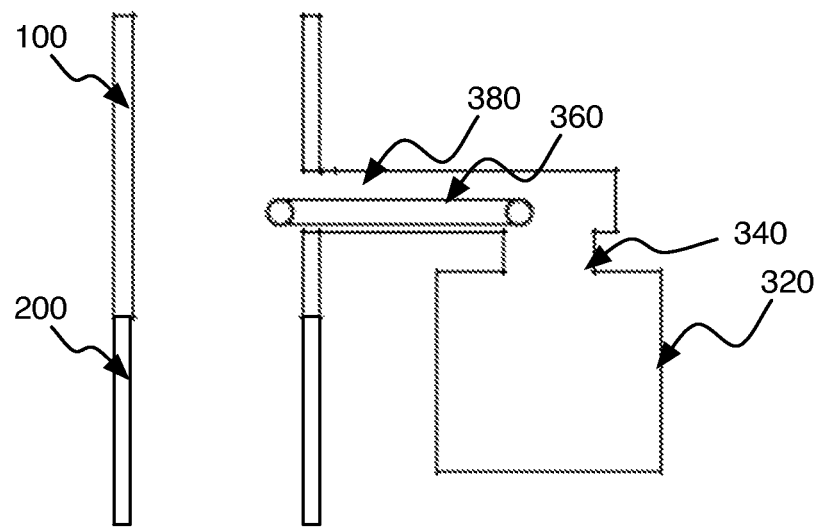
FIG. 5 is a schematic representation of a second variation of the char removal mechanism.
Figure 6:
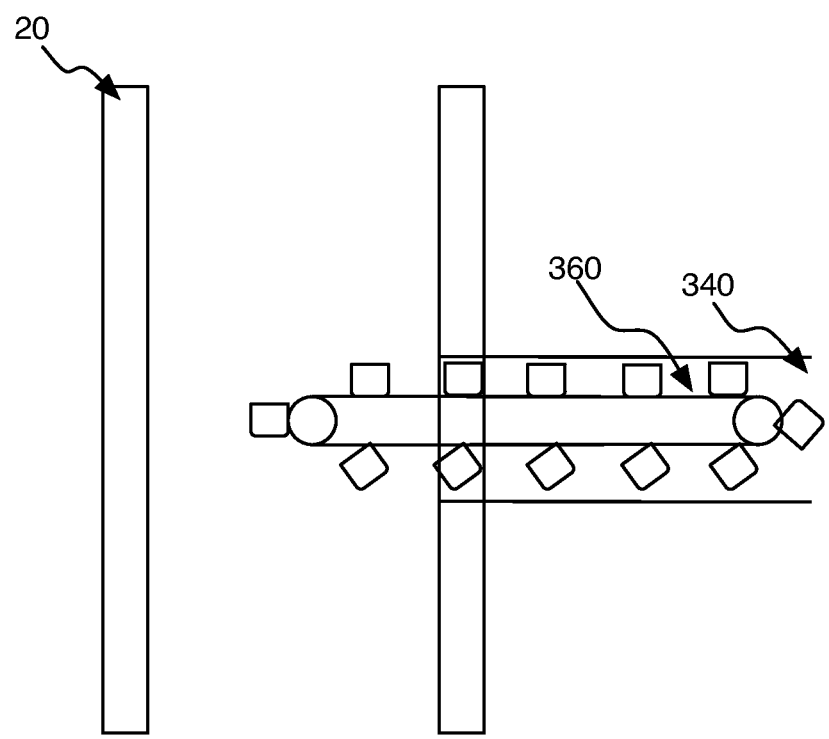
FIG. 6 is a schematic representation of a third variation of the char removal mechanism.
Figure 7A:
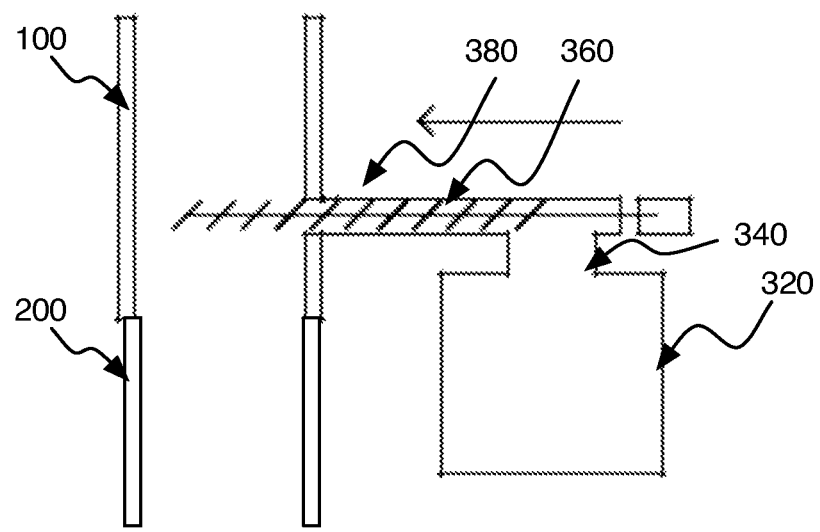
FIGS. 7A and 7B are schematic representations of a variation of a char removal mechanism operable in an extended and retracted mode, respectively.
Figure 7B:
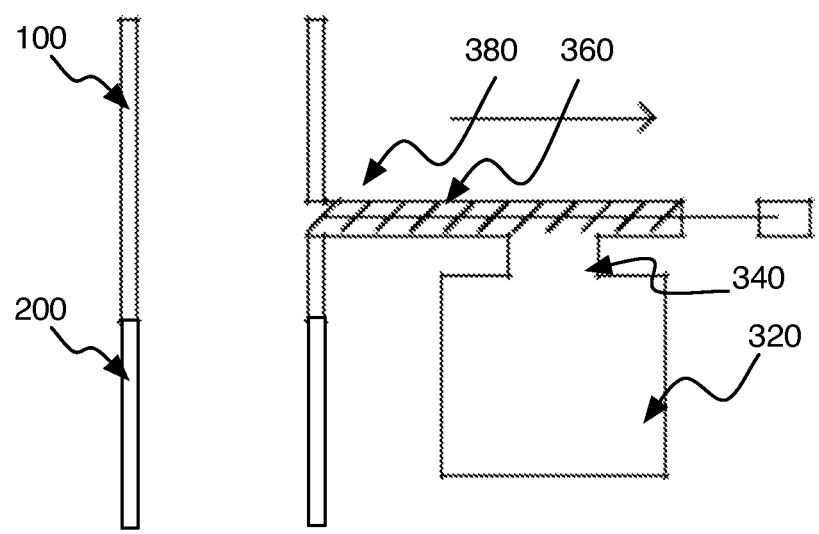

The char transporter 360 of the char removal mechanism 300 functions to transport char from the pyrolysis module interior to the access port 340, and can additionally function to transport char through the access port 340. The char transporter 360 can additionally function to cool the char, wherein the char transporter 360 is thermally conductive and is coupled to a lower temperature element (e.g., ambient air, a lower-temperature generator component such as the drying module 500, etc.). The char transporter 360 is preferably coupled to the pyrolysis module interior and the access port 340 at a first and second end, respectively. The first end of the char transporter 360 preferably extends into the active space of the pyrolysis module 100. The second end of the char transporter 360 preferably extends through to the outlet of the access port 340, but alternatively can only extend partway through the access port 340, extend only to the input of the access port 340, or extend to a point substantially near the access port 340 (e.g., a point above the access port 340). Alternatively, the char transporter 360 can couple to the access port 340 in any suitable configuration. The char transporter 360 preferably extends through the wall of the reaction module, but can alternatively extend through the wall of the pyrolysis module 100. The char transporter 360 preferably extends at an angle to the longitudinal axis of the reaction module and a normal vector, wherein the lower end of the char transporter 360 is preferably exterior the gasifier 20. However, the char transporter 360 can extend perpendicular to the longitudinal axis of the reaction module or extend at any suitable angle from the gasifier 20. In one variation, the char transporter 360 includes a material transporter, similar to those described above for the hopper transporter 420, dryer transporter, and pyrolysis transporter 120, but can alternatively be any suitable mechanism that facilitates char movement from the pyrolysis module interior toward the access port 340. The material transporter preferably extends along a longitudinal axis of a char channel 380 fluidly connecting the pyrolysis module interior with the access port 340, but can alternatively be configured in any suitable manner. For example, as shown in FIG. 4, the char transporter 360 can be an auger that acts as a screw conveyor to move char from the pyrolysis module interior to the access port 340, preferably the airlock of the access port 340. In another variation, as shown in FIG. 5, the char transporter 360 is a conveyor belt that feeds char from the pyrolysis module interior to the access port 340. However, the char transporter 360 can be a bucket (e.g., as shown in FIG. 6), flap gate, angled chute, tube, or any other suitable material transport mechanism. The char transporter 360 is preferably activated (driven) when the char removal mechanism 300 is in collection mode, and is preferably static (e.g., not moving relative to the pyrolysis module interior) when the char removal mechanism 300 is in standby mode. Alternatively, the char transporter 360 can be passive, wherein char falls into/onto the char transporter 360 until a threshold char mass is reached, wherein the char mass applies a driving force to the char transporter 360 to move the char out of the pyrolysis module 100. The char transporter speed is preferably determined and controlled by the control system, but can alternatively be controlled by a user. The char transporter 360 is preferably driven by a motor, but can alternatively be driven by a user (e.g., by using a hand crank). The char transporter 360 is preferably statically arranged relative to the longitudinal axis of the pyrolysis module (e.g., not retractable), but can alternatively be retractable (e.g., retractable in an axis perpendicular to the longitudinal axis of the pyrolysis mode) and extend at various lengths into the pyrolysis module lumen, as shown in FIGS. 7A and 7B.

The char removal mechanism 300 can additionally include a char reservoir 320 connected to the char transporter 360, wherein the char reservoir 320 receives and retains char removed by the char removal mechanism 300. The char reservoir is preferably a substantially sealed container with an opening connected to the char transporter 360, but can alternatively be an open-air container (e.g., a prism with an open end) or any other suitable container. The char removal mechanism 300 can additionally or alternatively include an airlock connected to an end of the char transporter 360, wherein airlock isolates the reactor atmosphere from the char reservoir. In this variation, the char transporter 360 and/or airlock preferably includes a cooling mechanism that cools the extracted char (e.g., heat fins, water or air heat exchange, etc.).

The gasifier 20 is preferably utilized within a power generation system 10 that produces electric power and char from carbonaceous material. The power generation system 10 preferably includes a hopper 400, a drying module 500, and an engine module 600. Some variations of the power generation system 10 can additionally include a second heat exchanger 510 and third heat exchanger 210 that function to heat the drying module 500 and air input of the reaction module 200 with waste heat from the hot gaseous fuel. Variations of the power generation system 10 can additionally include a particulate separator and a filtration system. The power generation system 10 is preferably substantially similar to the power generation system described in U.S. application Ser. No. 12/846,807, but can alternatively be substantially different. The power generation system 10 can be arranged substantially similarly to the arrangement described in U.S. application Ser. No. 13/833,918 filed 15 Mar. 2013 and titled "Compact Gasifer-Genset Architecture," incorporated herein in its entirety by this reference, but can alternatively be arranged in a substantially different configuration.

The engine module 600 of the power generation system 10 functions to convert gaseous fuel into electricity. The engine module 600 (genset) preferably includes an internal combustion engine that converts the gaseous fuel into motion, an alternator that converts the motion into electricity, and a drive mechanism that transfers motion from the engine to the alternator. Gaseous fuel is preferably introduced into the fuel inlet of the engine, more preferably into the carburetor of the engine from the filtration module 800, but can alternately be introduced from the second heat exchanger 510, the first heat exchanger 110, or directly from the third heat exchanger 210. As aforementioned, the engine and alternator are preferably arranged in an in-line configuration, but can alternatively have any suitable configuration. The engine preferably includes a radiator and an exhaust. The engine is preferably an internal combustion engine, and is preferably an inline cylinder configuration (e.g., 2, 3, 4, 5, or 6 cylinders, etc.), but can alternatively be any suitable engine. The alternator is preferably a standard 10 kW alternator, but can alternatively be a 20 kW alternator, a 100 kW alternator, or any other suitable alternator that converts motion from the engine into electricity. The drive mechanism is preferably a direct drive inline engine-alternator coupled solution, however a belt drive that couples the crankshaft of the engine to the rotor of the alternator or any other suitable drive mechanism can alternatively be used. However, any other suitable generator configuration that converts gaseous fuel into electric power can be used.

The second heat exchanger 510 of the power generation system 10 functions to heat the drying module 500 with waste heat from the hot gaseous fuel. The second heat exchanger 510 is preferably fluidly connected between the reaction module output and the engine carburetor, and is preferably thermally connected to the drying module 500. More preferably, the second heat exchanger 510 is fluidly connected between a particulate separator 700 and the engine carburetor, but can alternatively be connected to other generator components. The second heat exchanger 510 is preferably a thermally conductive annular channel surrounding the drying module 500, but can alternatively be a thermally conductive tube wrapped about the drying module perimeter or any other suitable heat exchanger thermally connected to the drying module 500. The inlet of the second heat exchanger 510 (portion proximal the reaction module 200) is preferably arranged proximal the outlet of the drying module 500 (proximal the pyrolysis module 100), but can alternatively be arranged elsewhere. The temperature of the gaseous fuel that exits directly from the reduction reaction in typical gasifers can be around 700-900° C., but the particulate separation module 700 and/or the third heat exchanger 210 can lower the temperature of this gaseous fuel output to around 200° C.-300° C. More preferably, the gaseous fuel output temperature is preferably lowered to a range of around 150° C.-220° C., which can increase the drying rate without inducing pyrolysis. However, any other suitable temperature can be used.

The third heat exchanger 210 of the power generation system 10 functions to preheat the air used to combust the tar gas within the reaction module 200 with waste heat from the hot gaseous fuel exiting the reaction module 200. The third heat exchanger 210 is preferably fluidly connected to, and receives fuel from, the fuel outlet of the reaction module 200, and is preferably thermally connected to the air intake for the reaction module 200. The third heat exchanger is preferably a thermally conductive annular channel surrounding the reaction module 200, wherein the air path is preferably located within the third heat exchanger. The air path is preferably defined by a thermally conductive pipe or tube, such that it is thermally coupled to but fluidly isolated from the gaseous fuel flowing within the third heat exchanger. The air path is preferably wound about the perimeter of the reaction module 200, and preferably extends along the length of the reaction module 200. However, the air path can include a boustrophedonic channel arranged parallel a longitudinal axis of the reaction module 200, a substantially straight air path extending perpendicularly into the reaction module 200, or have any other suitable configuration. The air path preferably has an air inlet fluidly connected to an oxygen reservoir (e.g., ambient environment) and an outlet fluidly connected to the reaction module interior. The inlet is preferably arranged at the bottom of the reaction module 200 (distal the pyrolysis module 100) and the outlet is preferably arranged at the top of the reaction module 200 (proximal the pyrolysis module 100). However, the inlet and outlet can be arranged in any suitable position. The third heat exchanger can also include a sediment collector located below the reaction module that collects particulates that are extracted from the gaseous fuel and/or the ash that results from the charcoal after the combusted tar gas is reduced with the charcoal. The sediment collector is preferably removable to allow for the sediments to be disposed of after use. However, any other suitable arrangement of the sediment collector can be used.

The power generation system 10 can be operated in several operation modes based on the electric power demand and char demand of the user. The operation modes can additionally be selected based on gasifier operation parameters, such as temperature and pressure, or the particular temperature, ramp rate, and residence time desired for biochar production. The char removal mechanism mode and reaction module air flow rate are preferably adjusted to obtain the desired operation mode, but the heating rate of the reaction module 200, heating rate of the pyrolysis module 100, and carbonaceous material transport rate into the pyrolysis module 100 can additionally or alternatively be adjusted.

In one variation of the power generation system 10, the gasifier is operable in a full char extraction mode, a partial char extraction mode, and a full power generation mode. As shown in FIG. 3, the power generation system 10 preferably includes a pyrolysis module 100, a pyrolysis module 200, a char removal mechanism 300 arranged between the pyrolysis module 100 and the reaction module 200, a first heat exchanger 110 thermally connected to the pyrolysis module 100, a flare 900, and an engine module 600. The pyrolysis module 200 is preferably arranged above a reaction module 200 (e.g., arranged along a gravitational vector, such that carbonaceous material from the pyrolysis module 100 travels along the gravity vector into the reaction module 200). The first heat exchanger is preferably fluidly connected to the engine exhaust and to a flare output. The first heat exchanger can additionally include a valve (e.g., a fluid switch) that selectively connects the first heat exchanger to the engine exhaust or flare output, but the first heat exchanger can alternatively be substantially unobstructed. The flare input is preferably fluidly connected to and receives tar gas 40 from the pyrolysis module 100, more preferably from the top of the pyrolysis module 100 but alternatively from any suitable portion of the pyrolysis module 100. The power generation system 10 can additionally include a second valve in the fluid connection between the flare input and the pyrolysis module 100 that selectively permits tar gas flow therethrough based on the mode of system operation. The engine carburetor is preferably fluidly connected to and receives gaseous fuel 30 from the reaction module 200. The power generation system 10 can additionally include a third valve in the fluid connection between the engine and the reaction module 200 that selectively permits gaseous fuel flow therethrough based on the mode of system operation. The power generation system 10 can additionally include a processor that controls the states of the valve(s) and/or the power generation system mode.

In the full char extraction mode, a substantial amount, more preferably all, of the char produced in the pyrolysis module 100 is removed from the system. The char removal mechanism 300 is preferably placed in the collection mode, the flare input is fluidly connected pyrolysis module 100, and the flare output is fluidly connected to the first heat exchanger (and therefore thermally connected to the pyrolysis module 100). In the full char extraction mode, char is preferably fully removed from the system, the remaining tar gas is provided to the flare 900, and the hot combusted tar gas 42 is used to heat the pyrolysis module.

In the partial char extraction mode, a portion of the char is extracted while the remaining char is used within the reaction module 200 to reduce the tar gasses into gaseous fuel, which is subsequently converted into electric power by the engine module 600. In this mode, both char and electric power can be produced. Furthermore, the relative amounts of char and electric power can be varied by varying the load applied to the engine module 600 (e.g., adjusting the electric power consumption) and/or adjusting the char extraction rate, wherein the char extraction rate is preferably substantially inversely related to the electric energy production rate. ½ to ¾ of the char produced is preferably the maximum amount of char that is removed to retain enough char to reduce the tar gasses, but the portion of char that is removed can alternatively be higher or lower. Alternatively, gaseous fuel can be made from combusting only a portion of the tar gas, and cracking the remainder into fuel gas, so more char could be removed. In one variation of this mode, the char removal mechanism 300 is preferably placed in the collection mode (or partially placed in the collection mode, such as partially extended into the pyrolysis module 100 plenum), the pyrolysis module 100 is connected to the reactor module 200 such that pyrolyzed material is passed to the reactor module 200, the engine is fluidly connected to the fuel output of reactor module 200, and the first heat exchanger is fluidly connected to the engine exhaust. In operation, a portion of the char is extracted from the system, the tar gas is reduced by the remaining char or combusted and cracked within the reaction module, the gaseous fuel is provided to the engine module 600 to produce electric power, and the engine exhaust (engine exhaust gas 602) is provided to the first heat exchanger to heat the pyrolysis module. In another variation of this mode, the pyrolysis module is cooperatively heated by combusted tar gas from the flare output and by the engine exhaust, wherein the first heat exchanger is preferably simultaneously fluidly connected to the flare 900 and the engine exhaust. The flare is preferably fluidly connected to the pyrolysis module 100 in this variation, wherein the tar gas flow rate from the pyrolysis module 100 to the flare is preferably actively controlled but can alternatively be passively controlled (e.g., dependent on the amount of tar gas that is reduced by the remaining char).

In the full power generation mode, char is preferably not extracted, and all resources are preferably used to generate syngas for the engine and resulting electric power. The char removal mechanism 300 is preferably placed in the standby mode, the pyrolysis module 100 is fully connected to the reaction module 200, the reaction module fuel outlet is fluidly connected to the engine module 600, and the engine exhaust is fluidly connected to the first heat exchanger. In operation, no char is removed from the system, wherein all the char is preferably used to reduce the tar gasses into gaseous fuel. The fuel is provided to the engine module 600, which converts the fuel into electric power. The engine exhaust is preferably provided to the first heat exchanger to heat the pyrolysis module 100.

However, the power generation system can be configured in any suitable configuration to obtain the generator outputs in the desired amounts.

As a person skilled in the art will recognize from the previous detailed description and from the figures and claims, modifications and changes can be made to the preferred embodiments of the invention without departing from the scope of this invention defined in the following claims.

I claim:

1. A gasifier, comprising:
    a pyrolysis module;
    a heat exchanger thermally coupled to the pyrolysis module and fluidly connected to an external heat source;
    a reaction module coaxially aligned with the pyrolysis module along a gravity vector, the reaction module operable to produce gaseous fuel;
    a char removal mechanism arranged between the reaction module and the pyrolysis module, the char removal mechanism operable between:
        a collection mode, wherein the char removal mechanism is active and collects char from a pyrolysis module interior; and
        a standby mode, wherein the char removal mechanism is static.

2. The gasifier of claim 1, further comprising an engine module comprising an engine and an alternator that converts fuel received from the reaction module into electrical power, the engine module comprising an engine exhaust fluidly connected to the heat exchanger, wherein external heat source comprises the engine exhaust.

3. The gasifier of claim 2, further comprising a flare configured to combust tar gas, the flare comprising a flare input and a flare output, the flare input fluidly connected to the pyrolysis module and the flare output fluidly connected to the heat exchanger, wherein the external heat source comprises the flare output.

4. The gasifier of claim 3, further comprising a controller that controls gasifier operation between:
    a full char extraction mode, wherein the char removal mechanism is in the collection mode, the flare inlet is fluidly connected to the pyrolysis module, and the flare outlet is fluidly connected to the heat exchanger; and a full power generation mode, wherein the char removal mechanism is in the standby mode, the engine module is fluidly connected to the reaction module, and the engine exhaust is fluidly connected to the heat exchanger.

5. The gasifier of claim 4, further comprising a valve arranged in a fluid path between the flare inlet and the pyrolysis module, wherein the valve selectively controls fluid flow from the pyrolysis module to the flare inlet.

6. The gasifier of claim 4, further comprising a drive mechanism that controls char removal mechanism operation between the collection mode and the standby mode, wherein the controller controls drive mechanism operation.

7. The gasifier of claim 2, further comprising a drying module connected to the pyrolysis module and a second heat exchanger thermally connected to the drying module, the second heat exchanger having an inlet fluidly connected to a gaseous fuel outlet of reactor module and an outlet fluidly connected to the engine module.

8. The gasifier of claim 7, further comprising a third heat exchanger, wherein the reaction module further comprises an air inlet, wherein the third heat exchanger is thermally connected to the air inlet and fluidly connected between the gaseous fuel outlet of the reactor module and the second heat exchanger.

9. The gasifier of claim 1, wherein the char removal mechanism extends perpendicular to a longitudinal axis into the pyrolysis module.

10. The gasifier of claim 9, wherein the char removal mechanism comprises an auger.

11. The gasifier of claim 10, wherein the char removal mechanism is retractable from the pyrolysis module.

12. The gasifier of claim 1, wherein the char removal mechanism is arranged between the pyrolysis module and a reduction zone of the reaction module.

13. The gasifier of claim 12, wherein the char removal mechanism is arranged between the pyrolysis module and a combustion zone of the reaction module.

14. The gasifier of claim 1, wherein the char removal mechanism further comprises a char reservoir arranged distal the pyrolysis module.

15. The gasifier of claim 14, wherein the char reservoir is open to the ambient environment, wherein the char removal mechanism further comprises a cooling mechanism thermally connected to the char removal mechanism and an airlock coupled to the char transporter between the pyrolysis module and the char reservoir.

16. A biochar and electric power generator that receives carbonaceous material, comprising:
    a pyrolysis module that pyrolyzes the carbonaceous material;
    a heat exchanger thermally connecting the pyrolysis module to an external heat source;
    a reaction module, connected to the pyrolysis module, that receives pyrolyzed carbonaceous material and produces gaseous fuel;
    a char removal mechanism arranged between the pyrolysis module and the reaction module;
    an engine module comprising an engine fluidly connected to the reaction module and an alternator mechanically connected to the engine, the engine module configured to produce electric power from the gaseous fuel, the engine module comprising an engine exhaust fluidly connected to the heat exchanger; and
    a flare fluidly connected to the pyrolysis module at a flare inlet and fluidly connected to the heat exchanger at a flare outlet, the flare configured to combust tar gas;
    wherein the char and electric power generator is operable between a full char extraction mode wherein substantially all produced char is removed from the pyrolysis module and tar gas combusted by the flare comprises the external heat source, and a full energy production mode wherein substantially all produced char is transferred into the reaction module and engine exhaust gas comprises the external heat source.

17. The generator of claim 16, further comprising a controller that controls char removal mechanism operation between a full collection mode, a partial collection mode, and a standby mode, wherein the generator is in the full char extraction mode when the char removal mechanism is operated at the full collection mode, in the full energy production mode when the char removal mechanism is in the standby mode, and is in a partial char extraction mode when the char removal mechanism is in the partial collection mode, wherein the external heat source comprises both the combusted tar gas and the engine exhaust gas.

* * * * *